United States Patent [19]

Miles et al.

[11] Patent Number: 5,456,869
[45] Date of Patent: Oct. 10, 1995

[54] DECKLE PISTON COMPRESSION AND ADJUSTMENT MECHANISM

[75] Inventors: Brian F. Miles, St. Paul; Gerald A. Majkrzak, Vadnais Heights; Richard G. Archer, Ham Lake, all of Minn.

[73] Assignee: May Coating Technologies, Inc., White Bear Lake, Minn.

[21] Appl. No.: 164,133

[22] Filed: Dec. 8, 1993

[51] Int. Cl.⁶ ................................................... B29C 47/16
[52] U.S. Cl. ...................... 264/39; 264/177.16; 425/381; 425/466
[58] Field of Search .................................. 425/466, 381, 425/382.4, 377, 147, 145; 264/169, 177.16, 39

[56] References Cited

U.S. PATENT DOCUMENTS

| | | | |
|---|---|---|---|
| 3,018,515 | 1/1962 | Shendon | 425/466 |
| 3,341,388 | 9/1967 | Bunyea | 156/244.23 |
| 3,428,521 | 2/1969 | Roy et al. | 162/366 |
| 3,652,409 | 3/1972 | Mack et al. | 252/12 |
| 3,706,518 | 12/1972 | Bunte et al. | 425/466 |
| 3,823,951 | 7/1974 | Eklund | 277/208 |
| 3,829,274 | 8/1974 | Melead | 425/466 |
| 3,832,120 | 8/1974 | Shaffer | 425/466 |
| 3,877,857 | 4/1975 | Melead | 425/133.5 |
| 3,957,414 | 5/1976 | Bussey, Jr. et al. | 425/384 |
| 3,980,043 | 9/1976 | Pomper | 118/60 |
| 4,081,321 | 3/1978 | Wolf et al. | 162/346 |
| 4,206,604 | 6/1980 | Reich | 60/518 |
| 4,231,129 | 11/1980 | Winch | 8/149.1 |
| 4,248,579 | 2/1981 | Maejima | 425/227 |
| 4,283,168 | 8/1981 | Miller et al. | 425/465 |
| 4,315,799 | 2/1982 | Turek et al. | 162/353 |
| 4,659,302 | 4/1987 | Maejima | 425/190 |
| 4,669,736 | 6/1987 | Meijer | 277/27 |

FOREIGN PATENT DOCUMENTS 734331  5/1966  Canada.

OTHER PUBLICATIONS

*MELTEX Information—Bulk Melters, Coating Heads & Stands* brochure (date unknown).

*Web Processing and Converting Technology & Equipment* edited by Donatas Satas, Van Nostrand Reinhold Company 1984 pp. 128–133.

*Dixon Bearing Manual—Self-Lubricating Rulon® and Dixon CJ Bearings Standard Stock & Custom* by Dixon, Dec. 1989.

*Introducing The Remarkable JKT–BDW—The first the only T–shaped extrusion die which can totally eliminate film edge beads.* (Jan. 1989).

"Deckle Die" information query from Converting Magazine, Nov. 1993.

*Primary Examiner*—Jay H. Woo
*Assistant Examiner*—Joseph Leyson
*Attorney, Agent, or Firm*—Vidas, Arrett & Steinkraus

[57] ABSTRACT

The inventive deckle piston compression and adjustment mechanism is used in changing the coating width of a die manifold. The deckle consists of elongate positioning shaft for positioning the deckle in the die manifold. A deformable sealing piston formed of Rulon LR is carried by the shaft and is constructed and arranged to substantially fill the die manifold. An expansion mechanism is used to expand the Rulon seal, thereby causing the deformable seal to expand to form a seal in the die manifold.

5 Claims, 3 Drawing Sheets

DECKLE PISTON COMPRESSION AND ADJUSTMENT MECHANISM

BACKGROUND OF THE INVENTION

1. Field of the Invention

The present invention relates to a deckle piston compression and adjustment mechanism. More specifically, the invention relates to a deckle piston compression and adjustment mechanism which prevents the die manifold from leaking.

2. Description of the Related Art

Coating web material with a die is a highly developed and well known field. Dies exist for coating substrates of any desirable size with a fluid. These fluids can be hot melts, water based, solvent based, one, two or multiple component based. It is common practice to coat substrates of varying width using a single die. For example, a 60 inch wide coater may be configured to coat a 50 inch wide substrate by having the die deckled 5 inches per side. The two deckles each carry a shim sized to fill the die land, thereby creating a die orifice 50 inches wide through which the coating material is extruded, as is well known in the art.

In order to adjust the position of the deckles, a prior art technique was to simply take the die apart and install the deckles and shims manually. This procedure was not only very time consuming, but hazardous if the die was hot and always creates a risk of damaging the die. As is well known in the art, dies are machined to very high tolerances, on the order of $1/10,000$ of an inch. Scratches on the die land create undesirable streaks in the coating.

In order to overcome the need to take the die apart, prior art adjustable deckles were developed to allow adjustment of the coating width by moving the deckles, without the need to dismantle the die. Existing adjustable deckles either use deckles which carry O-rings or use machined steel deckles which tightly fit the die manifold. Like May Coating Technologies other competitors, applicant utilized adjustable deckles in which precision machined steel deckles were designed to fit the die manifold, being machined approximately $1/1,000$ inch smaller than the size of the die manifold. These steel deckles either held one or more O-rings or seals to seal the die manifold and prevent the fluid from leaking, or relied on a close machined fit of the deckle in the manifold with no seals.

Leaking fluid is much more of a problem in die coating than in other types of dies such as plastic extruding dies, due to the much less viscous nature of many coatings. For comparison purposes water measures 1 centipoise, hot melt measures approximately 100 to 150,000 centipoise depending on the type, house paint measures approximately 750–5000 centipoise, peanut butter measures approximately 250,000–300,000 centipoise and plastic measures approximately in the range of 1–6 million centipoise. Because many desirable coating fluids, such as hot melt are much less viscous than extruded plastics they leak around seals much more readily.

Applicant has also found that prior art deckles leak under pressure. Prior art deckles also tend to seize up, making them difficult to move. Prior art deckles are also very expensive to machine and install since the tolerances need to be so close. The prior art deckles are very high maintenance, in part due to cut seals caused by imprecise machining and the build up of cured, dried, charred material cutting or tearing the seals as the seals slide over the cured, dried or charred material. Cut seals are caused by both by imprecise machining and the build up of cured, dried or charred material in the die manifold. In actual operation the die is used at a variety of widths. When the deckles are adjusted to provide a narrower coating width the fluid in the die manifold outside the coating width comes into contact with ambient air and cures, dries or chars. When the deckles are moved back to a wider position the hardened material causes the seals to cut or tear as the seals slide over the cured, dried, or charred material. Applicant has experimented with the use of scraper bars which would scrap the hardened cured, dried or charred material out of the path of the seals, but has found that these not only do not work, but can scratch the die manifold or bind.

The entire coating industry up until now has simply lived with the need for frequent down time required to replace torn seals or leaking deckles. Up until the present invention, applicant, like others, also simply put up with a certain amount of fluid material leaking out the ends of the die manifolds. In fact, prior to the current invention it was not uncommon to find cups or other containers attached to the ends of the die manifolds to catch the leaking coating fluid.

There remains a need for an improved deckle seal mechanism which would provide a better seal than O-rings or other seals and would not tear. This improved deckle seal would not only result in higher productivity due to less down time, but it is safer since it would not require disassembly of a hot, heavy, precisely machined die.

SUMMARY OF THE INVENTION

The inventive adjustable deckle overcomes the difficulties identified above by providing an improved seal which prevents leaking in the die manifold. The inventive deckle achieves this by substituting an acme threaded shaft which carries the inventive deckle for the prior art steel deckles which previously carried one or more 0rings or other seals. The inventive deckle carried by the acme threaded shaft consists of two shim clamps which carry a shim sized to fill the die landing. The shim clamp furthest in the die manifold, together with the end of the shim clamp define one end of a desired coating width. Both shim clamps, while allowing the acme threaded shaft to rotate freely, are positioned in fixed locations axially on the shaft. Between the two shim clamps and carried by the shaft are a Rulon® LR piston seal and a compression nut. The compression nut is used to compress the Rulon LR piston seal against a shim clamp, which causes the piston seal to expand to form the seal.

The acme threaded positioning shaft performs two functions. First, a nut captured in a gear is fixed to the outside of the die through which the shaft extends. A keyway in the shaft receives a lock key which prevents the shaft from rotating when the nut is turned via a handcrank. As the nut is turned the shaft is moved axially into or out of the die depending on the direction of rotation of the nut. Secondly, once the deckle carried by the shaft is in the desired position, the lock key is disengaged. The shaft can then be rotated. The compression nut has a different thread than the acme screw. This rotation causes the compression nut to force the Rulon LR piston seal against the shim clamp, causing the piston seal to expand and form a seal. The shim clamp is bored for clearance to the acme threaded shaft.

BRIEF DESCRIPTION OF THE DRAWINGS

A detailed description of the invention is hereafter described with specific reference being made to the drawings in which.

DESCRIPTION OF THE PREFERRED EMBODIMENTS

Figure 1:
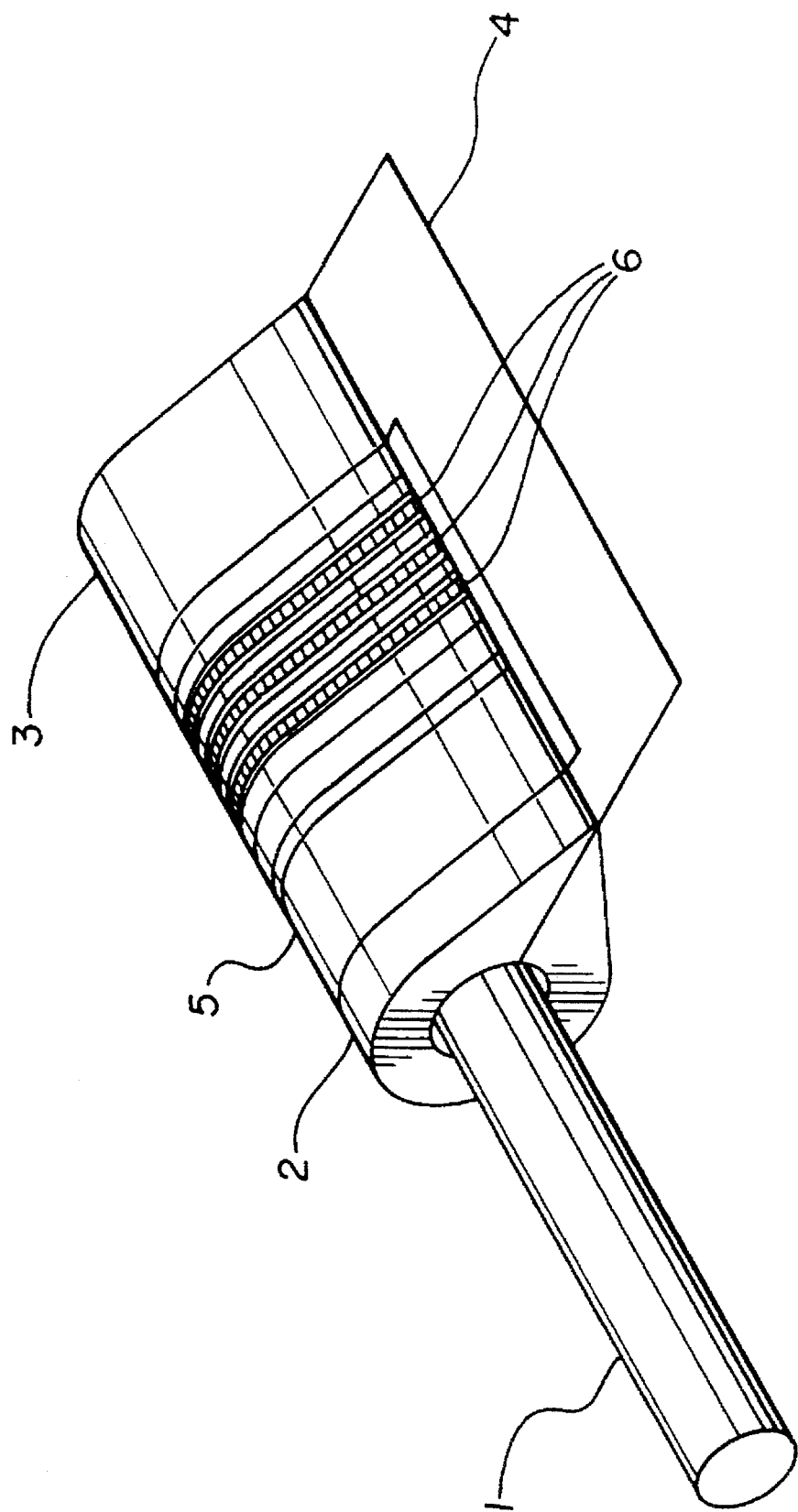
FIG. 1 is a perspective view of a prior art deckle design.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIG. 1, a prior art deckle is shown in which an acme threaded positioning shaft is shown at 1. The acme threaded shaft 1 carries two shim clamps 2 and 3 which are axially fixed on shaft 1. Shim clamps carry shim 4. In between clamps 2 and 3 is steel deckle 5 which typically carries three O-rings 6. Typically, each O-ring 6 is surrounded by two O-ring backup rings 7. As discussed above, this prior art deckle design has several problems. The biggest problem is caused by cured, dried or charred coating fluid such as hot melt tearing or cutting the O-rings 6 or 7.

Figure 2:
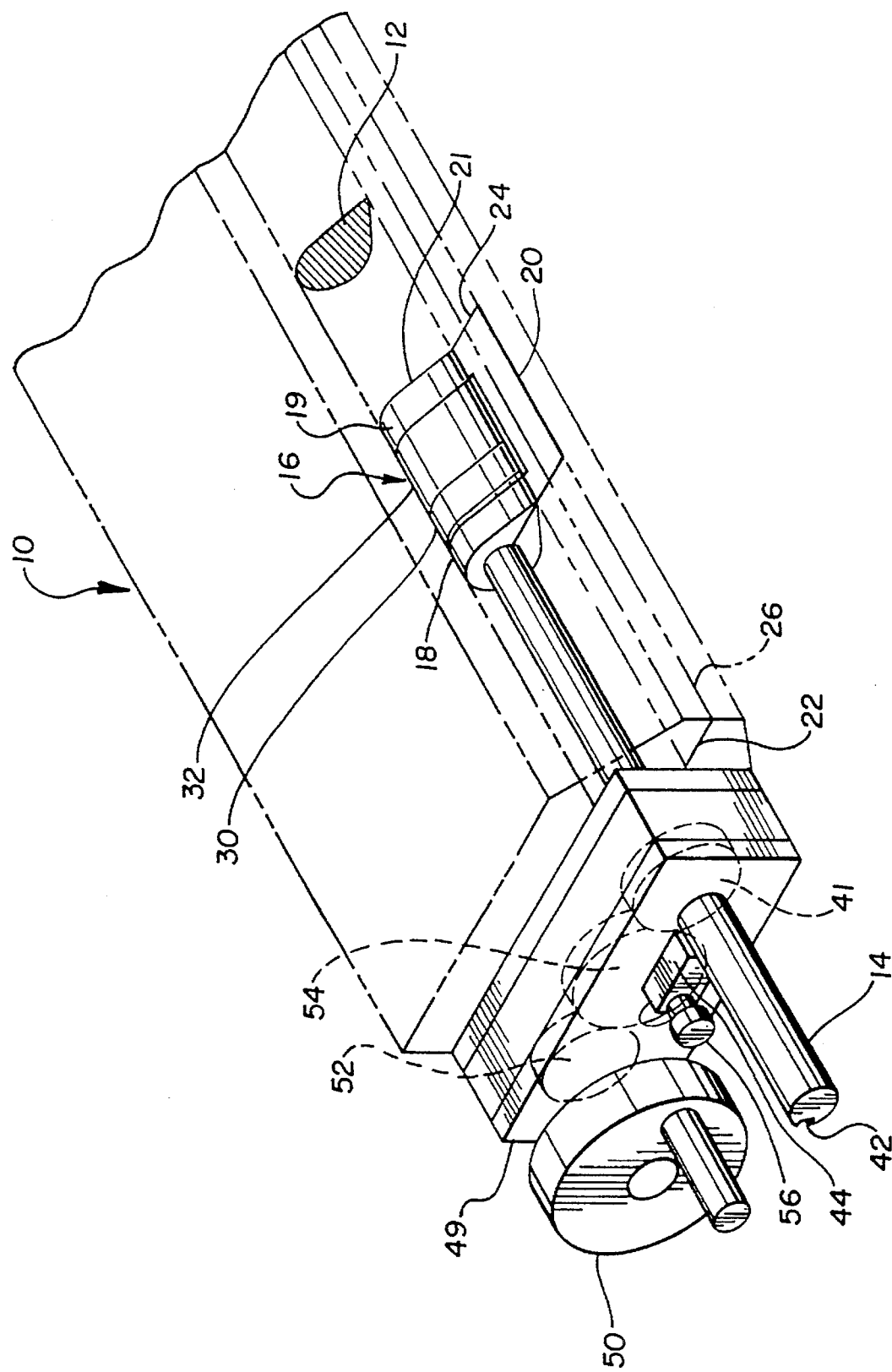
FIG. 2 is a perspective view of one of the inventive deckle piston seals shown installed in a die manifold, with the die shown in silhouette.

The inventive deckle is shown installed in a die shown in FIG. 2. One end of a die is shown generally at 10 with the die manifold shown at 12. The inventive deckle can be utilized in any type of die, but the inventive deckle is described herein in connection with May Coating Technologies D-1500 die. It can be seen that this type of die utilizes a tear-drop shaped die manifold which is well known in the prior art, although the inventive deckle could be used with any shape of die manifold. Although the inventive deckle can be used in connection with any desired coating fluid, the D-1500 die most commonly uses hot melt adhesive coating fluid.

Acme threaded shaft 14 carries and positions the deckle, which is referred to generally at 16. Deckle 16 is comprised of two shim clamps 18 and 19 which carry a shim 20 which is used to block the die landing 22. Shim clamp 19 forms one end of deckle 16 and the end face 21 of shim clamp 19 can be seen to form a plane which is perpendicular to the axis of shaft 14. Shim 20 is positioned in the two clamps 18 and 19 so that the end 24 of shim 20 lies in the plane defined by end face 21 of shim clamp 19. Together, end face 21 of shim clamp 19 of deckle 16 and end 24 of shim 20 define one end of a coating width. Another deckle of exactly the same design would be installed in the other end of the die manifold 12 to define the other end of the desired coating width. The coating fluid is introduced into the die manifold 12, filling up the manifold 12 between the two deckles 16, which define the desired coating width. The fluid fills up the die landing 22 between the ends 24 of each shim 20, and is extruded out die orifice 26 to coat the substrate. As is well known in the art, the height of the die orifice can be changed as desired, which would also require the appropriately sized shims 20.

Between the two shim clamps 18 and 19 and carried by the shaft 14 are compression nut 30 and Rulon sealing piston 32. It can be seen that both shim clamps 18 and 19, as well as compression nut 30 and Rulon sealing piston 32 are machined to substantially fill the die manifold. In order to form the seal, the Rulon sealing piston 32 is squeezed between compression nut 30 and shim clamp 19, which causes the deformable Rulon sealing piston 32 material to expand to completely fill the die manifold 12 to form the seal which prevents the fluid material from leaking out of the die manifold.

The preferred material for Rulon sealing piston 32 is Rulon LR, which is commercially available from Dixon of Briston, R.I. Rulon is a particular type of PTFE which is strong enough to form a good seal, slides easily over cured, dried or charred coating material in the die manifold, wears well and also expands between 3 to 5% at the temperatures typically found in a die coater. The deformable Rulon material also allows the seal to conform much better than prior art O-rings or seals to the perimeter of the die manifold when cured, dried, or charred coating material has built up on the die manifold. Although Rulon LR or its equivalent is preferred for use as sealing piston 32, any deformable material with enough strength to withstand the pressure exerted by the coating fluid around the edges of the seal could be used and is contemplated for use with this invention.

The acme threaded shaft 14 performs two functions. First, a nut 40 (best seen in FIG. 3) is captured by gear 41 which is fixed to the outside of the die through which the shaft 14 extends. A keyway 42 (best seen in FIG. 3) in shaft 14 receives a lock key 44 which prevents shaft 14 from rotating when captured nut 40 is turned. As captured nut 40 is turned, shaft 14 is moved axially into or out of the die depending on the direction of rotation of nut 40. Secondly, once the deckle 16 carried by shaft 14 is in the desired position, the lock 5key 44 is disengaged. Shaft 14 can then be rotated, which causes compression nut 30 to force the Rulon LR piston seal 32 against shim clamp 19, causing the piston seal 32 to expand and form a seal.

A gear box housing 49 is used to contain and support the mechanism used to axially move shaft 14. Hand wheel 50 is mounted to gear box 49 and is used to rotate captured nut 40 by means of gears 52, 54 which engage gear 41. Gear box housing 49 also carries lock key 44. Lock screw 56 fits in a slot in lock key 44 and is used to lock the key in its engaged or disengaged position.

Figure 3:
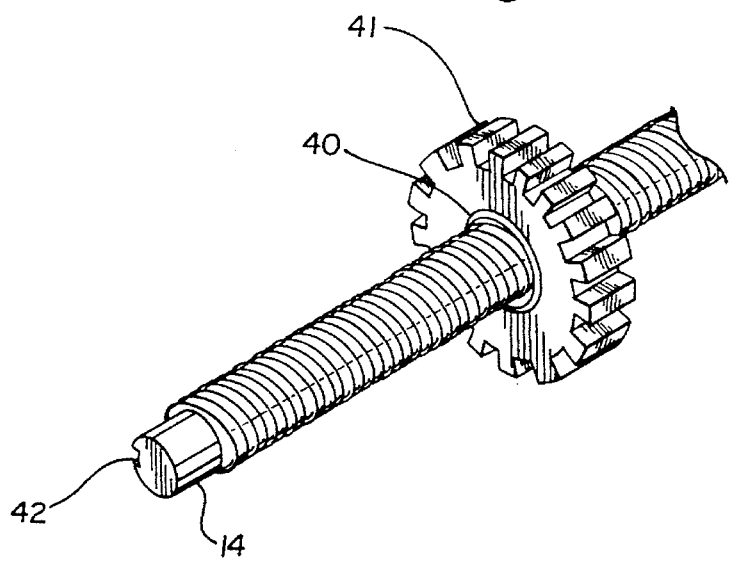
FIG. 3 is a more detailed perspective view of the acme threaded shaft extending through a gear with a captured nut which is rotated by the gear.

Referring now to FIG. 3, acme threaded shaft 14 extends through captured nut 40 which is captured inside gear 41. As gear 41 is rotated, captured nut 40 is rotated causing shaft 14 to move axially further into or out of die manifold 12, depending on the direction of rotation.

Figure 4:
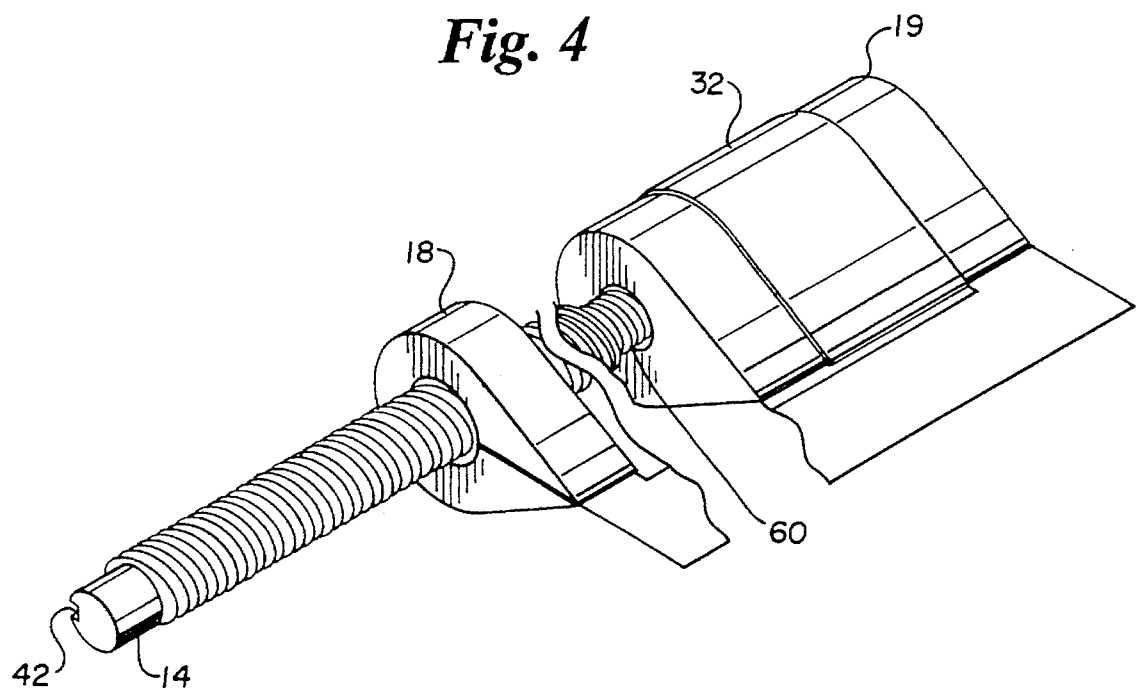
FIG. 4 is a more detailed perspective view of the narrowed diameter portion of the acme threaded shaft which carries the compression nut.

Referring now to FIG. 4, compression nut 30 can be seen to be carried on a narrowed diameter portion 60 of shaft 14. Therefore, the threads which carry compression nut 30 are different than the threads on acme threaded shaft 14. Rotation of shaft 14 does not cause any axial movement of shim clamps 18 and 19 on shaft 14. However, rotation of shaft 14 causes axial movement of compression nut 30 along narrowed portion 60 of shaft 14. This movement of compression nut 30 causes the compression and subsequent expansion of Rulon sealing piston 32, as well as the decompression of piston 32 to its normal uncompressed size.

In operation the inventive deckle, the operator would loosen a clamp or die bolt which controls the height of the die orifice unclamping shim 20 as is well known in the prior art. Shaft 14 is turned to loosen the compression nut 30 to allow the piston seal 32 to "shrink" to its normal uncompressed size. Lock key 44 would next be engaged and hand wheel 50 would be rotated until the deckle 16 was located in the desired axial position in die manifold 12. Lock key 44 would then be disengaged and shaft 14 would be manually rotated, which pushes the compression nut 30 towards fixed shim clamp 18 to "squeeze" or compress Rulon piston seal 32. Compression of piston seal 32 causes it to expand to form a tight seal in the die manifold. It has been found that simple hand strength can be used to rotate shaft 14 sufficiently to form the seal. It has been found experimentally that only approximately one rotation of shaft 14 is required to form the seal.

In order to move the deckle 16 to a new position, shaft 14 is loosened, allowing piston seal 32 to "shrink", which allows the deckle 16 to slide more easily in die manifold 12.

It can be seen that the two deckles in the preferred embodiment operate independently of each other. It is contemplated that if desired, the two deckles could be slaved together so that one hand wheel could be used to move both deckles in or out the same distance. It is also contemplated that other types of PTFE or other deformable material could be used in place of the Rulon LR of the preferred embodiment. All that is required is that the material be able to function in the proper temperature range and be strong enough to form the proper seal when compressed by compression nut 30. Any material which meets the foregoing criteria could be used in the inventive deckle.

Although the preferred embodiment describes using a compression nut to expand the Rulon piston seal 32, it is also contemplated that some other expansion means could be substituted and is considered routine engineering. For example, piston seal 32 could be a "balloon" type of piston seal and could be substituted for the solid Rulon piston seal, and the "balloon" seal could be expanded using pneumatic compressed air pressure or hydraulic fluid pressure, as is well known in the art.

This completes the description of the preferred and alternate embodiments of the invention. It is to be understood that even though numerous characteristics and advantages of the present invention have been set forth in the foregoing description, together with the details of the structure and function of the invention, the disclosure is illustrative only and changes may be made in detail, especially in matters of shape, size and arrangement of parts within the principals of the invention, to the full extent indicated by the broad, general meaning of the terms in which the appended claims are expressed. Those skilled in the art may recognize other equivalents to the specific embodiment described herein which are intended to be encompassed by the claims attached hereto.

What is claimed is:

1. An adjustable deckle apparatus for use in changing the coating width of a die manifold, comprising:

a deckle and elongate positioning means for positioning the deckle in the die manifold, the elongate positioning means comprised of an a key lock, a first nut, and acme threaded shaft which is moved axially in the die manifold by rotating the a first nut which is fixedly attached to the die manifold through which the acme threaded shaft extends, and wherein the acme threaded shaft includes a keyway which receives the key lock to prevent the acme threaded shaft from rotating about its axis as it moves axially within the die manifold by means of the rotating nut;

the deckle comprising deformable sealing means for forming a seal, carried by the elongate positioning means and constructed and arranged to substantially fill the die manifold, and expansion means for expanding the deformable sealing means, wherein the expansion means comprises an abutment means fixedly attached to a deckle end of the elongate positioning means and a compression means carried by the elongate positioning means, the deformable sealing means being carried between the compression means and the abutment means wherein whereby when the compression means is moved axially along the elongate positioning means towards the abutment means, the deformable sealing means is compressed and expands to form a seal in the die manifold, and the deckle further comprising shim and a shim clamp wherein the abutment means is constructed and arranged to carry one end of the shim, the other end of the shim is carried by the shim clamp, the shim filling a die landing communicating with the die manifold to define one end of a coating width, and wherein the compression means is comprised of a compression nut through which acme threaded shaft extends, wherein the shaft is rotated when the key lock is disengaged from the keyway to move the compression nut to compress the deformable sealing means against the abutment means to expand the deformable sealing means sufficiently to form a seal.

2. The adjustable deckle apparatus of claim 1 wherein the die manifold is tear-drop shaped and wherein the abutment means, deformable sealing means, compression means and the shim clamp are also tear-drop shaped and sized to substantially fill the die manifold.

3. The adjustable deckle apparatus of claim 1 wherein the deformable sealing means is made of polytetrafluoroethylene.

4. A method of adjusting the deckle apparatus of claim 1 comprising the steps of:

moving the deckle to a location in the die manifold by rotating the first nut while the key lock is engaged in the keyway, disengaging the key lock from the keyway, and expanding the deformable sealing means by rotating the shaft to form a seal which prevents leaking.

5. The method of adjusting the deckle apparatus of claim 4, further comprising the steps of:

rotating the acme threaded shaft to loosen the compression nut to allow the deformable sealing means to return to its unexpanded state;

engaging the key lock in the keyway to prevent rotation of the acme threaded shaft;

rotating the first nut through which the acme threaded shaft extends to position the acme threaded shaft as desired in the die manifold, the shaft being moved axially within the die manifold by the rotating nut without the shaft rotating;

disengaging the key lock to allow the shaft to be rotated, and rotating the acme threaded shaft to tighten the compression nut to expand the deformable sealing means to form a seal.

* * * * *

UNITED STATES PATENT AND TRADEMARK OFFICE
CERTIFICATE OF CORRECTION

PATENT NO. : 5,456,869
DATED : October 10, 1995
INVENTOR(S) : Brian Miles, et al.

It is certified that error appears in the above-indentified patent and that said Letters Patent is hereby corrected as shown below:

Col. 2, line 35, delete "Orings" and insert --O-rings--;

Col. 4, line 33, delete "5key" and insert -- key --;

Col. 5, line 4, delete "18" and insert -- 19 --;

Col. 6, line 10, delete "whereby";

Signed and Sealed this

Twenty-sixth Day of December, 1995

Attest:

BRUCE LEHMAN

Attesting Officer        Commissioner of Patents and Trademarks